United States Patent [19]

Eustache et al.

[11] Patent Number: 4,794,818
[45] Date of Patent: Jan. 3, 1989

[54] TRANSMISSION MECHANISM, FOR WINDSCREEN WIPERS IN PARTICULAR, AND A WINDSCREEN WIPER DEVICE FITTED WITH SUCH A MECHANISM

[75] Inventors: Jean-Pierre Eustache, Antony; Daniel Maubray, Issy-les-Moulineaux, both of France

[73] Assignee: Equipements Automobiles Marchal, Issy-les-Moulineaux, France

[21] Appl. No.: 932,501
[22] PCT Filed: Mar. 26, 1986
[86] PCT No.: PCT/FR86/00103
§ 371 Date: Nov. 5, 1986
§ 102(e) Date: Nov. 5, 1986
[87] PCT Pub. No.: WO86/05751
PCT Pub. Date: Oct. 9, 1986
[51] Int. Cl.$^4$ .............................................. B60S 1/24
[52] U.S. Cl. ................................ 74/600; 15/250.16
[58] Field of Search ................ 74/600, 837, 836, 570; 15/250.16, 250.17

[56] References Cited

U.S. PATENT DOCUMENTS

| | | | |
|---|---|---|---|
| 3,716,887 | 2/1973 | Bellware | 74/600 |
| 4,400,844 | 8/1983 | Hayakawa et al. | 15/250.16 |
| 4,454,626 | 6/1984 | Schmidt et al. | 15/250.16 |
| 4,559,845 | 12/1985 | Fallows | 15/250.16 X |
| 4,686,733 | 8/1987 | Sahara | 74/70 |

FOREIGN PATENT DOCUMENTS

| | | | |
|---|---|---|---|
| 1099876 | 2/1961 | Fed. Rep. of Germany | 15/250.16 |
| 815657 | 7/1959 | United Kingdom | 15/250.16 |

*Primary Examiner*—Gary L. Smith
*Assistant Examiner*—Rodney M. Lindsey
*Attorney, Agent, or Firm*—Cushman, Darby & Cushman

[57] ABSTRACT

The transmission mechanism (M) allows the effective length (L) of the crank (6) to be varied to obtain a "parked position" of the windscreen wiper. The mechanism comprises an eccentric (9) secured to the shaft (3), this eccentric being mounted in a bore (13) of the crank (6); locking structure (V) for locking the rotation between the eccentric (9) and the crank (6) to ensure a linkage in rotation in one direction and to release the eccentric from rotation with the crank in the opposite direction; and locking structure (D) for locking the crank (6) for rotation in relation to the support (4) when the shaft (3) rotates in the reverse direction to the normal direction, as well as at the start of the rotation of the shaft in the normal direction. The mechanism comprises a sleeve (24) fixed to the support, a bush (27) mounted in the sleeve and freely traversed by the shaft (3) and locking structure (37) for locking the bush (27) for rotation in relation to the sleeve (24) when the shaft (3) rotates in the reverse direction to the normal direction of operation, the bush being free to rotate in relation to the sleeve in the normal direction.

8 Claims, 6 Drawing Sheets

TRANSMISSION MECHANISM, FOR WINDSCREEN WIPERS IN PARTICULAR, AND A WINDSCREEN WIPER DEVICE FITTED WITH SUCH A MECHANISM

The invention relates to a transmission mechanism, for windscreen wipers in particular, between a rotary drive shaft fixed in relation to a support and a crank arm or similar for actuating an alternating oscillating motion, it being possible to reverse the direction of rotation of the rotary shaft.

The transmission mechanisms aimed at by the invention are of the kind comprising a crank of a variable effective length, this length having a first value under normal operation for a given direction of rotation of the shaft, whilst an increase of the effective length of the crank is actuated when operation is stopped by a reversal of the direction of rotation of the shaft. In the case where such a mechanism is used for the actuation of windscreen wipers, these latter assume a withdrawn position or "parked position" when, after normal operation has been stopped, the increase of the normal length of the crank is actuated.

Such mechanisms comprise: an eccentric, secured for rotation on the drive shaft, the said eccentric being mounted in a bore provided in the crank; means for locking the rotation between the eccentric and the crank provided on the periphery of the eccentric to ensure a linkage in rotation between the eccentric and the crank in the normal direction of rotation of the shaft, and to release the eccentric for rotation in relation to the crank in the opposite direction of rotation of the shaft; and means for locking the crank for rotation in relation to the support when the shaft rotates in the reverse direction to the normal direction, as well as at the start of rotation of the shaft in the normal direction, whilst the crank is free to rotate in relation to the support during the subsequent operation in the normal direction.

The prior art corresponding to such a mechanism is summed up, for example, at the beginning of the patent application FR No. 2 497 743.

The object of the invention is, above all, to make the transmission mechanisms of the kind defined above in such a way that they should meet the various practical requirements better than heretofore and in particular in such a way that they should operate more reliably and more accurately. It is, moreover, desirable that these mechanisms should be of a relatively simple design and easy to assemble. It is, moreover, desirable that the design of the mechanism should lead to silent operation.

According to a first aspect, a transmission mechanism for a windscreen wiper device in particular, of the kind previously aimed at, is characterised in that the means for locking the rotation of the crank in relation to the support comprise:

a sleeve or similar, fixed to the support and centered on the shaft, this sleeve comprising a central recess;

at least one bush freely traversed in rotation by the shaft and mounted in the central recess of the sleeve, this bush being linked in rotation with the crank, and means for locking the bush in rotation in relation to the sleeve when the shaft rotataes in the reverse direction to the normal direction of operation, the bush being free to rotate in relation to the sleeve in the normal direction.

Advantageously, the sleeve has a radial extension at its end next to the crank, this extension being situated along the axial direction between the crank and the sleeve. The linkage in rotation of the crank and of the bush is advantageously ensured by a pin or similar member, integral with the crank and orientated substantially orthogonally to the median plane of this crank, the pin projecting towards the sleeve and passing through a radial hole provided in the said extension so that a translational motion between the crank and the bush should be permitted.

The means for locking the bush for rotation in relation to the sleeve, during the reversal of the direction of rotation of the shaft, may comprise a device with a free wheel or an equivalent device (ratchet wheel) placed between the sleeve and the bush in such a way that, for the normal direction of rotation, the bush should be free in relation to the sleeve whilst in the reverse direction, the free wheel is locked and ensures a linkage in rotation of the sleeve and of the bush.

According to another possibility, the means for locking the the bush for rotation in relation to the sleeve comprise a finger orientated substantially radially carried by the sleeve and pushed elastically radially towards the inside against the cylindrical surface of the bush which comprises a slot intended to accommodate the end of the finger. Preferably, a ring mounted around the shaft is disposed axially against the bush and is joined to the latter with scope for angular deflection, the said ring comprising a second slot which can be aligned or displaced angularly in relation to that of the bush, the said finger having a thickness along the direction of the shaft which suffices for cooperation with the surfaces of the bush and of the ring so that the finger can only lock the bush in rotation, in relation to the sleeve, when the slots of the bush and of the ring are aligned.

The linkage in rotation, with the possibility of an angular displacement between the bush and the ring, can be ensured by a pin anchored in the bush intended to cooperate with a hole or similar in the form of a circular arc provided on the ring.

According to another aspect a transmission mechanism of the kind defined above, is characterised in that the means for locking the crank for rotation in relation to the support comprise, at least for ensuring the locking of the crank at the start of the normal rotational motion, a pin type device or similar member, orientated substantially parallel to the shaft axis, capable of cooperating with a recess or similar, orientated radially, one of the elements (pin or recess) being fixed for rotation in relation to the support, whilst the other element is integral with the crank, these two elements being disengaged from each other during the normal operation of the mechanism.

The pin may be provided on the crank, whilst the recess is provided on a component, in particular the sleeve referred to above, integral with the support. The emergence of the pin from the recess is obtained at the start of the normal rotational motion whilst the entry of the pin into the recess is obtained during the reversal of the direction of rotation. The pin can pass through the radial hole referred to above provided in a radial extension of a bush.

The invention also relates to a windscreen wiper device comprising a transmission mechanism such as defined above.

Apart from the arrangements set out above, the invention consists of certain other arrangements which will be discussed in greater detail below, in connection with particular modes of embodiment described above with reference to the attached drawings but which are in no way restrictive.

FIG. 1 of these drawings is a diagram illustrating the wiping ensured by a windscreen wiper set in the "parked" position.

Figure 15:
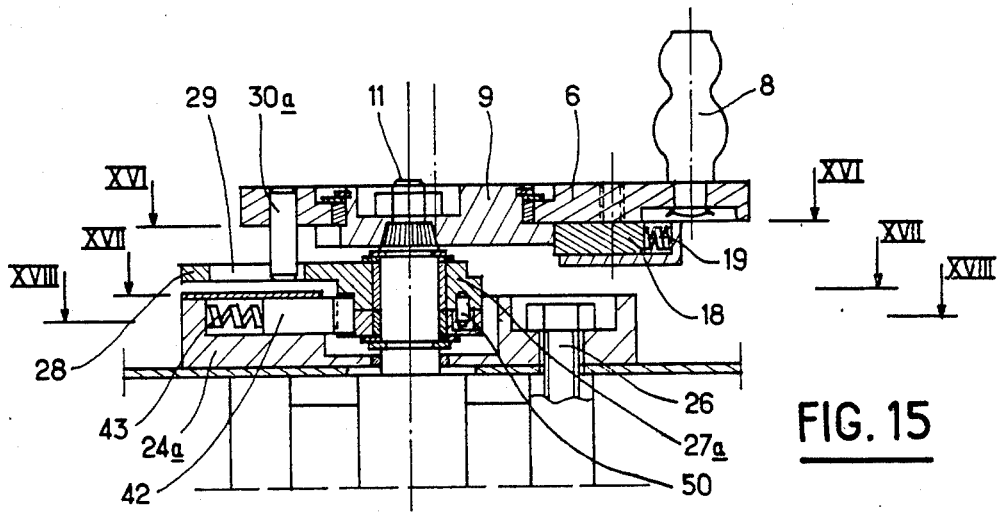
FIG. 15 shows an axial cross section of the mechanism of FIG. 11 in the "parked" position.
Figure 18:
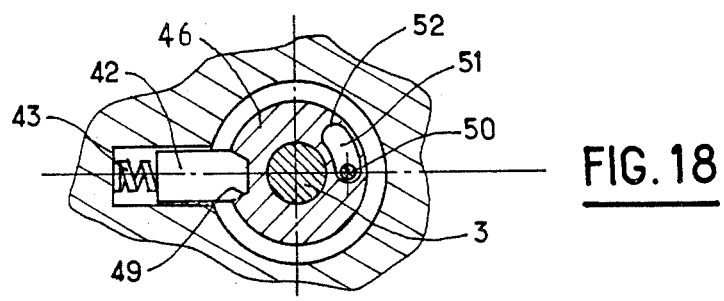

FIG. 18, finally, is a cross section along line XVIII—XVIII of FIG. 15.

The description which follows concerns the application of the transmission mechanisms in accordance with the invention to windscreen wiper devices.

Figure 1:
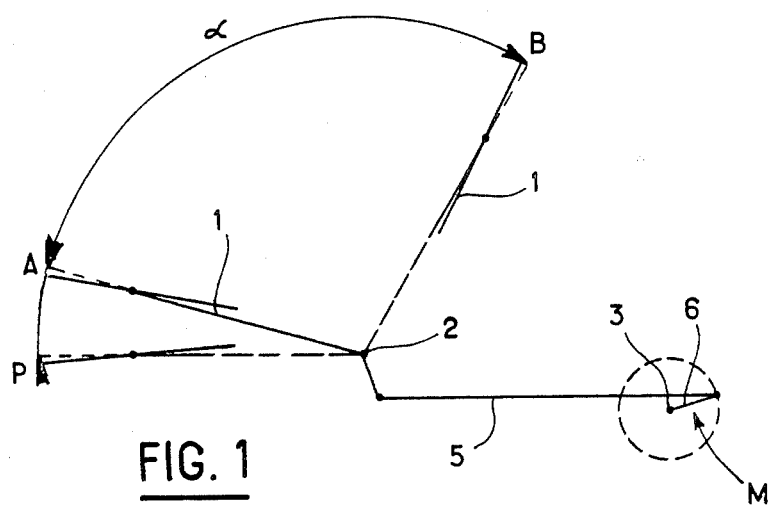
Figure 2:
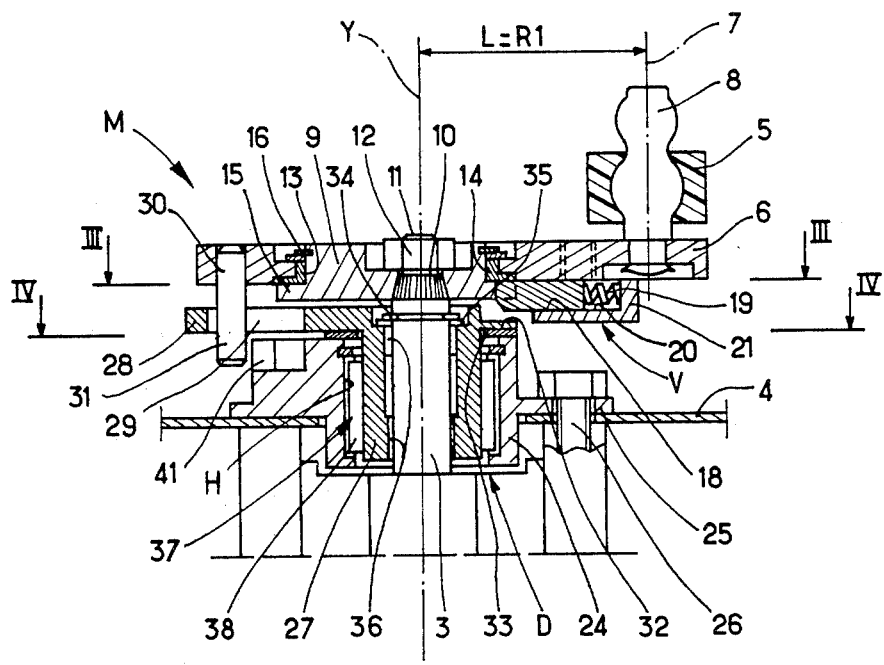
FIG. 2 is an axial cross section of a first mode of embodiment of a transmission mechanism in accordance with the invention, the crank having the effective length corresponding to normal operation.

FIG. 1 illustrates the wiping ensured by a windscreen wiper arm 1 turning around a pin 2. The normal wiping cycle is effected between the two angular end positions A and B forming an angle $\alpha$ between them. This wiping cycle is obtained with a rotation in a given direction or normal direction of a drive shaft 3 (FIG. 2).

When the wiping is caused to stop, the arm comes to be positioned in position A; the drive shaft 3 stops; the direction of rotation of the shaft 3 is then reversed and the arm 1 passes into a withdrawn position or "parked" position designated by P in FIG. 1. When the arm has attained this position P, the drive motor of the shaft 3 is stopped. In the "parked" position P, the arm and the windscreen wiper attached to this arm are in general no longer visible on the windscreen or other surface to be wiped and are situated for instance below the extension of the surface of the body.

A transmission mechanism M is provided between the rotating shaft 3 which is fixed in relation to a support 4 and a crank arm 5 or similar member (FIGS. 1 and 2) for the actuation of the windscreen wiper arm or arms such as 1.

The mechanism M comprises a crank 6 whose effective length L is variable. The effective length L designates the distance between the geometric axis Y of the shaft 3 and the geometric axis 7 of a crank pin 8 fixed near the end of the crank 6 for the articulation of the crank arm 5.

The length L has a first value R1 (FIG. 2) in normal operation (the normal wiping cycle) for a given direction of rotation of the shaft 3 (anti-clockwise direction of rotation in accordance with the representation of the drawings).

After the shaft 3 has been stopped in an angular position corresponding to the position A (FIG. 1) of the windscreen wiper arm 1, the direction of rotation of the shaft 3 is reversed. The mechanism M produces an increase in the effective length L of the crank which then assumes the value R2 represented in FIG. 5. This increase in the effective length of the crank 6 whose angular position is not modified, causes the wiper 1 to pass into the "parked" position P.

The mechanism M comprises an eccentric 9 secured for rotation with the drive shaft 3. This eccentric 9 is formed by a disc whose centre is offset by a distance e in relation to axis Y. The distance e is smaller than the radius of the disc 9.

The disc 9 may be secured to shaft 3 by means of a splined frustoconical bearing surface 10 provided at the end of the shaft 3, capable of cooperating with a conjugate bearing surface provided in a hole of the eccentric 9 for the passing of the end 11 with the smaller diameter of the shaft 3. This end 11 is threaded so that a nut 12 can be screwed on to the said end 11 to secure the eccentric 9 axially on the bearing surface 10.

The eccentric 9 is mounted in a bore 13 provided in the crank 6. The cylindrical bore 13 has an identical centre with that of the eccentric 9. Provision may be made for an anti-friction ring 14 between the cylindrical surface of the eccentric 9 and the surface delimiting the bore 13. The hold along the axial direction of the crank 6 in relation to the eccentric 9 may be ensured on the one hand by a radial shoulder 15 of the eccentric extending against the transverse face of the crank 6 beyond the contour of the bore 13 and, on the other hand, by a split stop ring 16 anchored in a groove of the eccentric. The transverse cross section of the anti-friction ring 14 may be L shaped whereof one arm extends against the shoulder 15 as may be seen in FIG. 2.

Provision may be made for means V for locking the eccentric 9 for rotation in relation to the crank 6 at the periphery of the eccentric 9 to ensure a linkage in rotation between the eccentric 9 and the crank 6 in the normal direction of rotation of the shaft 3, that is to say, the anti clockwise direction according to the representation of the drawings and to release the eccentric 9 from rotation in relation to the crank 6 for the opposite direction of rotation, that is to say, for the clockwise direction according to the representation of the drawings.

These means V comprise, on the side of the eccentric 9, a slot 17 provided at the periphery of the shoulder 15, and opening radially towards the outside. On the side of the crank 6, the means V comprise a plate 18, or similar, elastically pushed, in particular by a spring 19 towards the inside in a radial direction, the internal radial end of the plate 18 having a conjugate shape to that of the slot 17 so that it can enter into it. This plate 18 is slidably mounted against the face of the crank 6 turned towards the support 4, in a recess 20 determined, for instance, by a component 21 fixed against the crank 6. The shape of the slot 17 and the conjugate shape of the end of plate 18 are determined in such a way that, for the normal direction of rotation (anti-clockwise direction in the case of the drawings) the driving force transmitted by the eccentric 9 to the crank 6 should not have a tendency to move the plate 18 away radially, whilst with the reverse direction of rotation, the driving force of the eccentric 9, transmitted to the crank 6 drives the plate 18 out of the slot 17; the eccentric 9 is then released from rotation in relation to the crank 6. For this purpose, the rear edge 22 of the slot 17 along the normal direction of rotation is orientated substantially parallel to the direction of the radius passing through the centre of the eccentric 9 and the centre of the slot 17, whilst the front edge 23 of the said slot 17 is inclined in relation to the direction to the said radius so that the width of the slot progressively increases as one moves from the centre of the eccentric 9. The conjugate end of the plate 18 has the shape of a right-angled trapezium.

Provision is moreover made for means D for locking the crank 6 for rotation in relation to the support 4 when the shaft 3 rotates in the reverse direction to the normal direction (that is to say, according to the drawings, when the shaft 3 rotates in a clock-wise direction) and at the start of the rotation in the normal direction; the means D leave the crank 6 free to turn in relation to the support 4 during the subsequent operation in the normal direction.

The means D comprise a sleeve 24 or similar, fixed on the support 4 and centered on the shaft 3. This sleeve 24 may comprise at its periphery, lugs 25 (FIG. 2) pierced by holes for the passage of the screws 26 for fixing on the support 4. A bush 27, through which shaft 3 freely passes in rotation, is mounted in the central recess H of the sleeve 24, this bush 27 being linked in rotation to the crank 6.

In accordance with the mode of embodiment of FIGS. 2 to 10, the linkage in rotation of crank 6 and of the bush 27 is ensured by means of a radial extension 28 provided at the end of the bush 27 turned towards crank 6; this extension 28 comprises a hole 29 orientated radially, transversed by a pin 30 or similar which is integral with the crank 6.

The pin 30 is orientated orthogonally to the median plane of the crank 6. The length of the pin 30 is sufficient for its end 31 which is remote from the crank 6 to project beyond the extension 28. The diameter of the pin 30 is substantially equal to the width 1 (FIG. 3) of the hole 29 so that the linkage in rotation between the crank 6 and the bush 27 should be obtained with reduced clearance. The radial dimension h (FIG. 3) of the hole 29 is at least equal to 2e, and preferably exceeds this value so that the crank 6 can be displaced radially in translation, in relation to the bush 27.

At its end turned towards the crank 6, the bush 27 is provided on its external cylindrical portion with a flange 32 bearing axially by means of an anti-friction washer 33 on the axial end of the sleeve 24.

The bush 27 is moreover stopped axially, in relation to the shaft 3 by a split ring 34 anchored in a groove of the shaft 3; an anti-friction washer 35 is provided between the ring 34 and a frontal bearing zone of the bush 27. The split ring 34 opposes a displacement of the bush 27 parallel to the axis of the shaft 3 towards the crank 6. The assembly with scope for rotation of the shaft 3 in the bush 27 may be effected by means of anti-friction bearings 36 disposed between the external surface of the shaft 3 and the internal surface of the bush 27 parallel to the axis of the shaft 3.

In accordance with the mode of embodiment of FIGS. 1 to 10, the means D comprise a free-wheel 37 or a ratchet wheel or equivalent, disposed between the internal surface of the bush 27 and the cylindrical internal surface of the sleeve 24. This free-wheel 37 may be of the spindle or roller type 38. The free-wheel 37 is arranged in such a way that for rotation of the shaft 3 in the normal direction, that is to say, in an anti-clockwise direction according to the representation of the drawings, the bush 27 (and hence the crank 6) may turn freely in relation to the sleeve 24; on the other hand, for the opposite direction of rotation (a clock-wise direction of rotation), the bush 27 is locked for rotation in relation to the sleeve 24.

Figure 4:
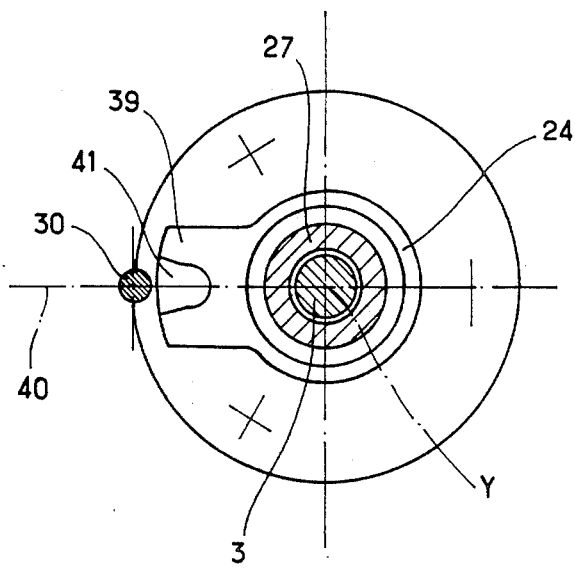
FIG. 4 is a cross section along line IV—IV of FIG. 2.

As may be seen in FIG. 4, this sleeve 24 comprises a radial extension 39 whose median line 40 corresponds to the angular position of the median line of the crank 6 in the stop position at the end of travel before being set into the "parked" position. This extension 39 comprises a recess 41 opening at the periphery of the extension 39 and on the side of this extension turned towards the crank 6. As may be duly seen in FIG. 4, the pin 30 occupies the same angular position as the recess 41 when the crank 6 is in the stopped position.

This being the case, the operation of the transmission mechanism in accordance with the mode of embodiment of FIGS. 2 to 10 is as follows.

In normal operation, the crank 6 occupies, in relation to the eccentric 9, the position represented in FIG. 2 corresponding to a minimum effective length. The locking plate 18 is engaged in the slot 17 (FIG. 3) and the rotation of shaft 3 in the normal direction (anti-clockwise direction) ensures that the crank 6 is driven in rotation. The crank 6 / crank arm 5 system transforms this continuous rotational motion into an alternating oscillating motion of the windscreen wiper arm 1 between the positions A and B of FIG. 1.

When the user causes the windscreen wiper to stop, a device (not shown) ensures that the electric motor continues to be supplied with power which drives the shaft 3 by a system of gears or similar (not shown) until the windscreen wiper arm 1 reaches the stop position A of FIG. 1.

This motion is continued with the shaft 3 still turning in the normal direction (anti-clockwise direction).

When the wiper arm 1 has arrived in position A, the motor driving the shaft 3 is stopped and its rotation in the opposite direction is automatically actuated. The shaft 3 will therefore turn in the reverse direction to the normal direction, that is to say, according to the representation of the drawing in a clockwise direction.

Figure 8:
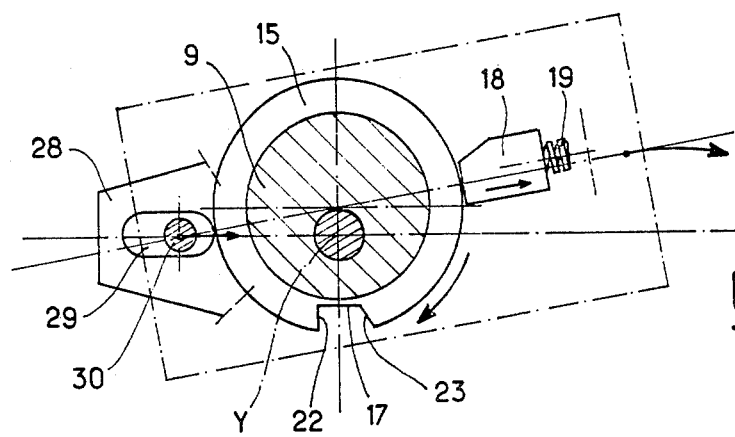
FIGS. 8 to 10 are cross sections similar to those of FIG. 6 illustrating respectively the setting into the "parked" position, the emergence from the "parked" position and the engagement of the normal cycle.

At the time when the arm 1 arrives at position A, the pin 30 is located opposite the recess 41 but is radially separated from this screen as represented in FIGS. 2 and 4. Because of the rotation of the shaft 3 in the reverse direction, the free-wheel 37 will produce a locking effect and the bush 27 is fixed for rotation in relation to the sleeve 24. The crank 6 is itself fixed for rotation because of the cooperation of the pin 30 with the hole 29. Moreover, the cooperation of the inclined front edge 23 of the slot 17 with the corresponding inclined edge of the plate 18 produces a radial displacement of this plate 18 towards the outside and against the spring 19; the plate 18 emerges from the slot 17 and the eccentric 9 is released from rotation in relation to the crank 6 as shown in FIG. 8.

Figure 3:
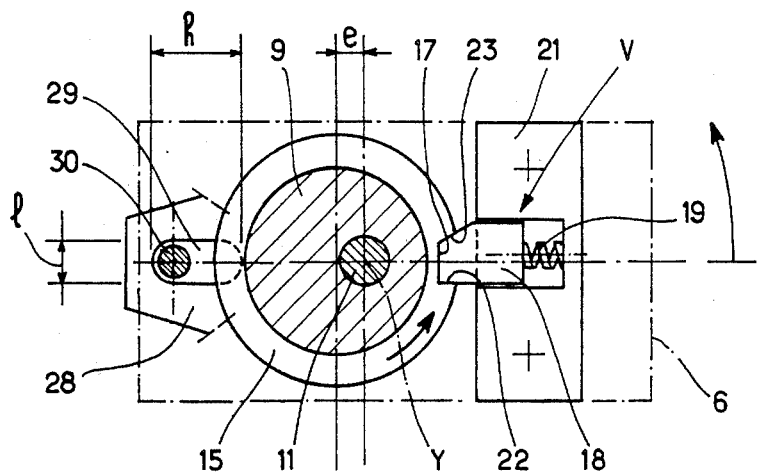
FIG. 3 is a cross section along line III—III of FIG. 2.

Provision is made for switching means (not shown) to cause the drive of the shaft 3 to stop when the eccentric 9 has described a half turn starting from the angular position represented in FIG. 3. During this half turn, the crank 6 whose angular position in relation to the sleeve 24 and to the support 4 does not vary, is displaced radially from the left towards the right according to the representation of FIG. 2 by a distance 2e.

The pin 30 enters, by radial displacement, into the recess 41. At the end of the half turn of the eccentric 9, the configuration of the mechanism corresponds to that shown in FIG. 5. The effective length of the crank 6 has assumed its maximum value.

The increase in the effective length of the crank 6 has entailed the passing of the windscreen wiper arm 1 from position A to the "parked" position P (FIG. 1).

The power of the electric motor (not represented), driving the shaft 3 is then cut.

Figure 5:
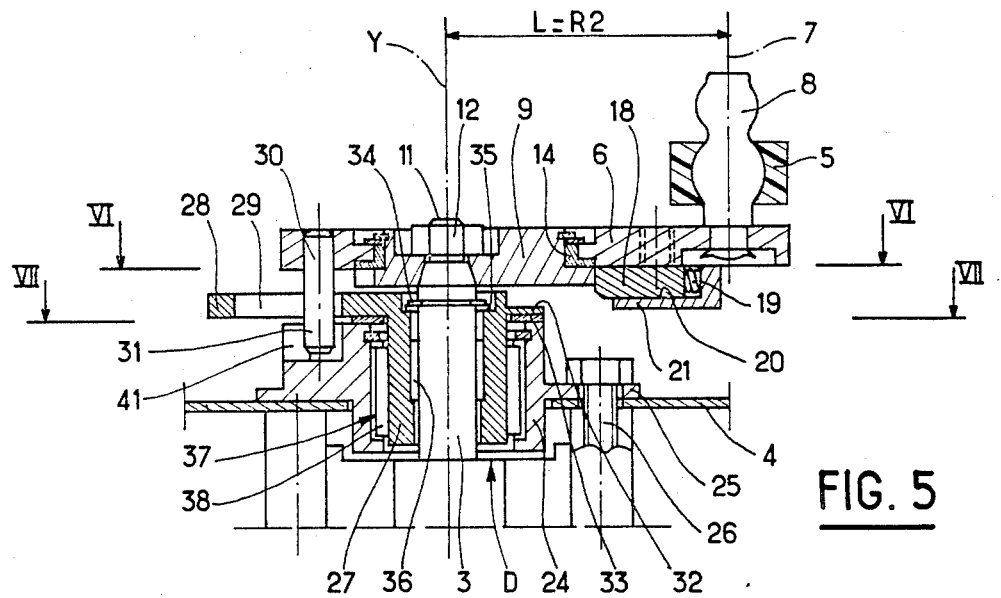
FIG. 5 shows similarly to FIG. 2, the transmission mechanism in a position wherein the effective length of the crank is at its maximum and corresponds to the "parked" position of the windscreen wiper.
Figure 6:
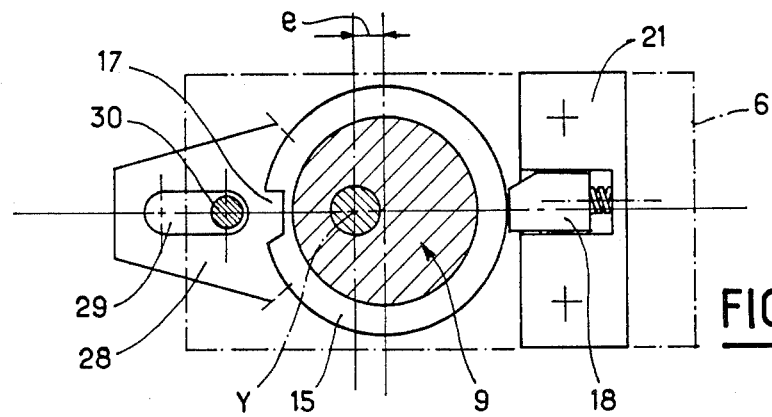
FIG. 6 is a cross section along line VI—VI of FIG. 5.
Figure 7:
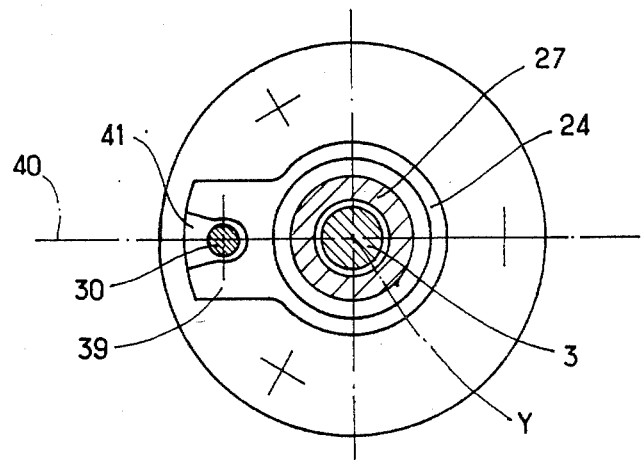
FIG. 7 is a cross section along line VII—VII of FIG. 5.

When the user actuates the windscreen wiper, the transmission mechanism is in the configuration represented in FIG. 5.

The shaft 3 is caused to move in the normal direction of rotation, that is to say in an anti-clockwise direction in the example considered.

Because of this, the free-wheel 37 no longer effects a locking action and allows the bush 27 to rotate in relation to the sleeve 24 in this direction of rotation. However, the pin 30 which is engaged in the recess 41 prevents the crank 6 for being driven along by frictional forces.

Figure 9:
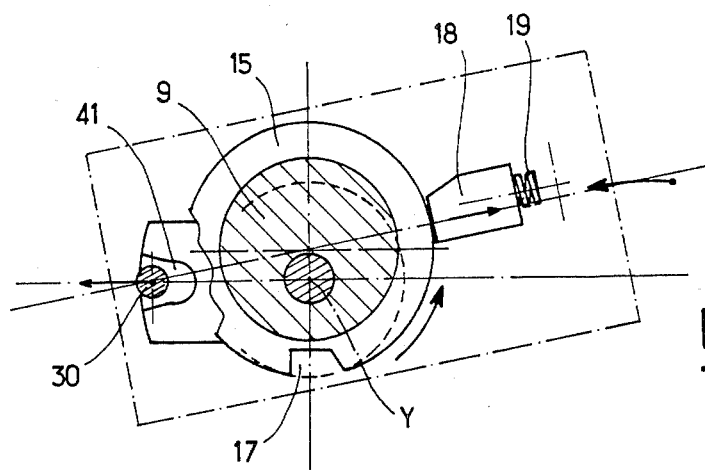

The eccentric 9 will, therefore, turn in relation to the crank 6, as represented in FIG. 9.

This relative rotational motion of the eccentric and of the crank 6 produces a rotational motion of this crank 6 in relation to the sleeve 24 and the support 4 in such a direction that the pin 30 moves radially away from the shaft 3 and emerges from the recess 41.

Figure 10:
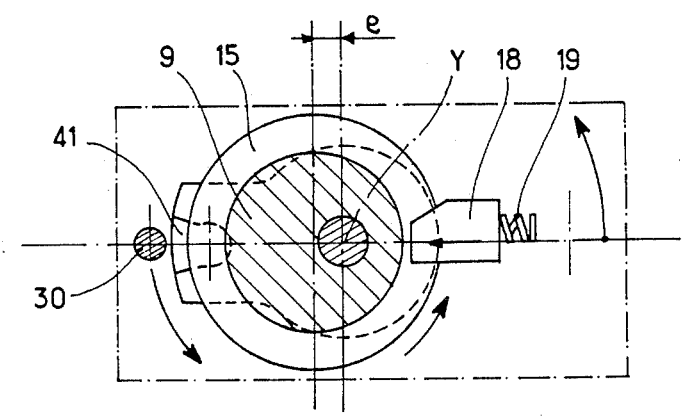

When the eccentric 9 has completed its half turn the slot 17 will be located opposite the plate 18 which will enter into this slot to ensure the linkage in rotation of the eccentric 9 and the crank 6. FIG. 10 shows this engaged position which corresponds to the end of the emergence from the "parked" position P and to the start of the normal wiping cycle.

FIGS. 11 to 18 illustrate another mode of embodiment of the invention. The elements of the transmission mechanism of FIGS. 11 and the following ones which are similar to, or perform similar functions to elements already described with reference to the preceding Figures, will be designated by the same reference numerals possibly followed by the letter a without their description being resumed in detail.

The sleeve 24a, of shorter axial length than is the case in FIGS. 2 and 5, carries a finger 42 orientated substantially radially and pushed elastically by a spring 43 towards the inside, against the cylindrical surface of the bush 27a. This bush comprises a slot 44 (FIG. 13) intended to receive the end 45 of of the finger 4. The transverse edges of this end 45 converge slightly on the opposite side to the spring 43; the slot 44 has a conjugate shape with a cross section of an isosceles trapezium whose large base is open over the surface of the bush 27a.

The linkage in rotation of the bush 27a and of the crank 6 is ensured by the pin 30a engaged in the hole 29. The length of this pin 30a is shorter than that of pin 30 of FIGS. 2 and 5. The end 31a of the pin 30a comes to be flush with the face of the extension 28 turned towards the sleeve 4a. An axial clearance subsists between this end 31a and the adjacent face of the sleeve 24a.

A ring 46 mounted around the shaft 3 is disposed axially against the bush 27a between the latter and the sleeve 24a. The bush 27a and the ring 46 are free to rotate in relation to the shaft 3 and are held stacked against each other by the ring 34, anchored in the shaft 3 on the side of the crank 6 and by another elastic and split ring 47 anchored in a groove of the shaft 3 on the side of the of the sleeve 24a. Provision may be for antifriction bearings 48 or similar between on the one hand, the shaft 3 and, on the other hand, the bush 27a and the ring 46.

The bush 27a and the ring 46 are linked in rotation with scope for angular displacement. The ring 46 comprises another slot 49 (FIG. 14) which can be aligned (superposed) or displaced angularly in relation to the slot 44 of the bush 27a. The FIG. 42 has a thickness m along the direction of the shaft 3 which is sufficient for cooperating with the surface of the bush 27a and the ring 46, as may be seen in FIG. 11. In practice, the finger 42 is disposed so as to cooperate roughly over the upper half of its thickness (according to the representation of FIG. 11) with the bush 27a whilst it cooperates with its lower portion with the ring 46.

The linkage in rotation with scope for angular displacement between the bush 27a and the ring 46 may be ensured by a pin 50, anchored in a recess provided on the face of the side of the bush 27a turned towards the ring 46. This pin projects on the side of the ring 46 in relation to the bush 27a parallel to the axis of the shaft 3. A portion of this pin 50 is engaged in a circular arc-shaped hole 51 provided in the ring 46.

When the bush 27a is rotating in the normal direction (anti-clockwise direction according to the representation of the drawings) the pin 50 comes to bear against the end 52 (FIG. 14) of the hole 51. The ring 46 is driven by the bush 27a remaining in this relative angular position wherein the slot 44 is angularly displaced in relation to the slot 49 (see FIG. 13). In the example of the embodiment shown, the slot 44 is situated ahead, according to the normal direction of rotation, in relation to the slot 49.

Preferably, the angular displacement is chosen in such a way that no portion of the slots 44 and 49 is superposed when the pin 50 bears against the end 52.

Thus, when the two slots 44, 49 are displaced with respect to each other, the end 45 of the finger 42 remains in bearing contact against the surface of the bush 27a or of the ring 46, as one of the slots passes. Since the finger 42 does not enter into these slots as they pass, there does not result therefrom any unwanted noise during the passing of this finger 42.

Provision is made for control means (not shown) for controlling the alignment, that is to say, the superposition of the slots 44 and 49 when the windscreen wiper device is caused to stop. These control means are arranged in such a way that the slots are aligned when the direction of rotation of the shaft 3 is changed. The position on changing the direction of rotation is such that the slots 44 and 49 being superposed are opposite the finger 42 which does enter into these slots to lock the bush 27a and the ring 46 for rotation in relation to the sleeve 24a.

By way of a non-restrictive example, the means controlling the alignment of these two slots could be constituted by a torsion spring (not shown) restraining the ring 46 in relation to the bush 27a in the aligned position, the couple exerted by this torsion spring being weaker than that developed by the pin 50 to drive the ring 46 in rotation; when the shaft 3 stops, the bush 27a no longer exerts any driving couple on the ring 46 and the torsion spring can restrain this ring 46 into the aligned position of the slots 44, 49.

Provision could be made for other control means, in particular at the level of the electric control of the driving motor of the shaft 3 to ensure the alignment of the slots.

After the rotation of the shaft 3 in the normal direction has been stopped, and the finger 42 has entered into the superposed slots 44, 49, the shaft 3 is caused to rotate in the reverse direction. This reversal of the direction of rotation can, for instance, be obtained by means of a contact actuated when the finger 42 has entered into the slots 44, 49, this contact ensuring that the electric motor driving the shaft 3 is caused to rotate in the opposite direction.

The operation of the transmission mechanism of FIGS. 11 to 18 is similar to that described above.

In normal operation, the eccentric 9 is linked for rotation to the crank 6 whose effective length is at its minimum (configuration of FIG. 11) by means of the plate 18 being engaged in the slot 17.

When the windscreen wiper device is stopped, the shaft 3 continues to rotate in the normal direction until the windscreen wiper blade attains position A (FIG. 1). Then the shaft 3 stops, the slots 44 and 49 are aligned as explained above and the finger 42 enters into these slots. The rotation of the bush 27a is then stopped in relation to the sleeve 24a and the support 4.

The rotation of the shaft 3 in the reverse direction is then actuated, generally by a reversal of the direction of rotation of the motor driving this shaft. The bush 27a is not driven along in this rotational motion; the crank 6 linked to the bush 27a by the pin 30a which cooperates with the hole 29 is itself stopped from rotating in relation to the support 4.

Figure 16:
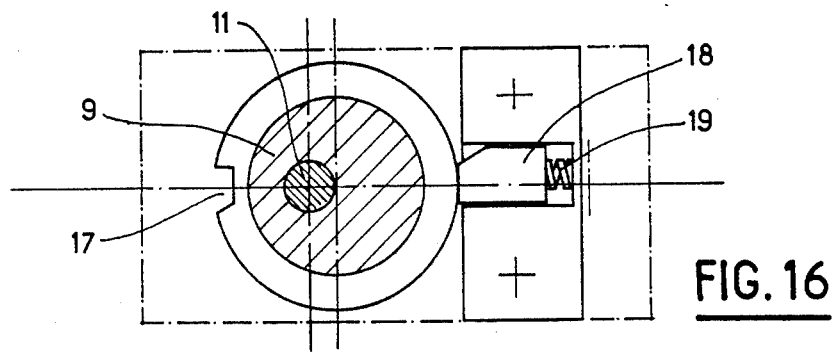
FIG. 16 is a cross section along line XVI—XVI of FIG. 15.

The eccentric 9 will therefore rotate in the opposite direction on its own (clock-wise direction) causing the plate 18 to emerge from the slot 17. The rotation of the shaft 3 in the reverse direction is caused to stop when this shaft 3 has rotated by 180° in relation to the initial position as represented in FIG. 16.

The crank 6 has been displaced in translation by a distance 2e in relation to the support 4. The configuration of the mechanism is then that of FIG. 15 which corresponds to the maximum effective length of the crank 6. The increase in the length of crank 6 has been accompanied by the passing of the arm 1 from the position A of FIG. 1 to the "parked" position P.

When the arm 1 arrives in this position P, the complete stoppage of the motor and of the shaft 3 is actuated.

Figure 17:
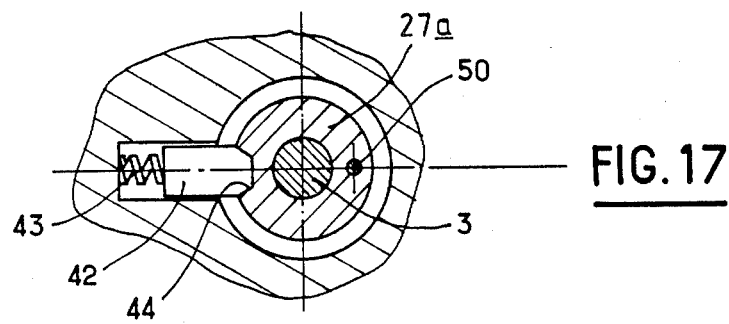
FIG. 17 is a cross section along line XVII—XVII of FIG. 15.

FIGS. 17 and 18 illustrate the respective positions of the bush 27a and of the ring 46 when the arm 1 is in the "parked" position. As may be seen in FIG. 18, the pin 50 is located against the end of the hole 51 on the opposite side to the end 52.

When the user reactivates the operation of the windscreen wiper device, the shaft 3 is driven from the start in its normal direction of rotation (anti-clockwise direction according to the representation of the drawings). The eccentric 9 rotates a half a turn in relation to the crank 6 which reassumes its minimum effective length so that the arm 1 returns to position A of FIG. 1.

On completion of the half turn of the eccentric 9, the plate 18 enters into the slot 17 and the crank 6 is driven in rotation by the eccentric 9.

The pin 30a does itself cause the bush 27a to rotate; the action of the inclined edges of the slot 44 produces the emergence of the finger 42 from the said slot. The ring 46, in particular by reason of its inertia, is lagging in relation to the rotation of the ring 27a and the pin 50 will be displaced in hole 51 until it comes to bear against the end 52. From this instant, the ring 46 is driven positively in rotation by the bush 27a since the slots 44 and 49 are no longed aligned.

The transmission mechanisms in accordance with the invention are of a simple and robust design; their operation is particularly smooth, reliable and accurate. The modes of embodiment described do, moreover, operate silently.

Such transmission mechanims are particuarly suitable for windscreen wiper devices but may be used in all cases where it is desirable to have a stopping position for a device driven by the mechanism which is situated beyond one of the end positios of an alternating oscillation.

It is clear that the invention is not limited to the modes of embodiment described and that many possible variants come into the protective range.

Figure 11:
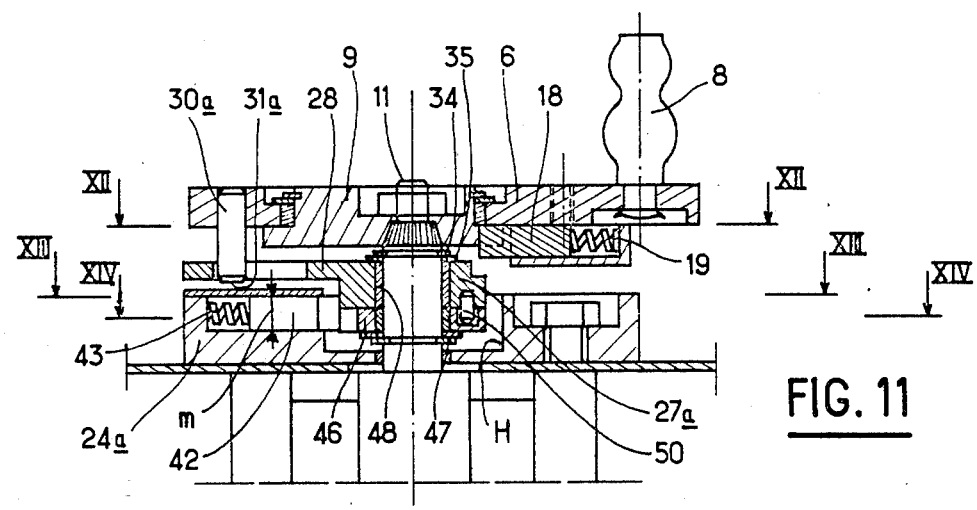
FIG. 11 is an axial cross section of a second mode of embodiment of a transmission mechanism in accordance with the invention in the normal position.
Figure 12:
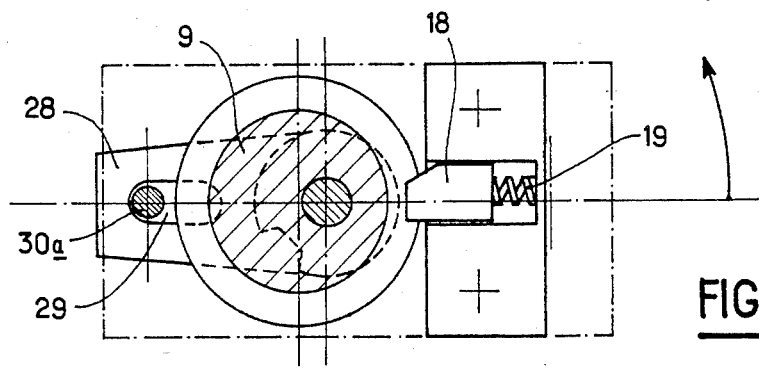
FIG. 12 is a cross section along line XII—XII of FIG. 11.
Figure 13:
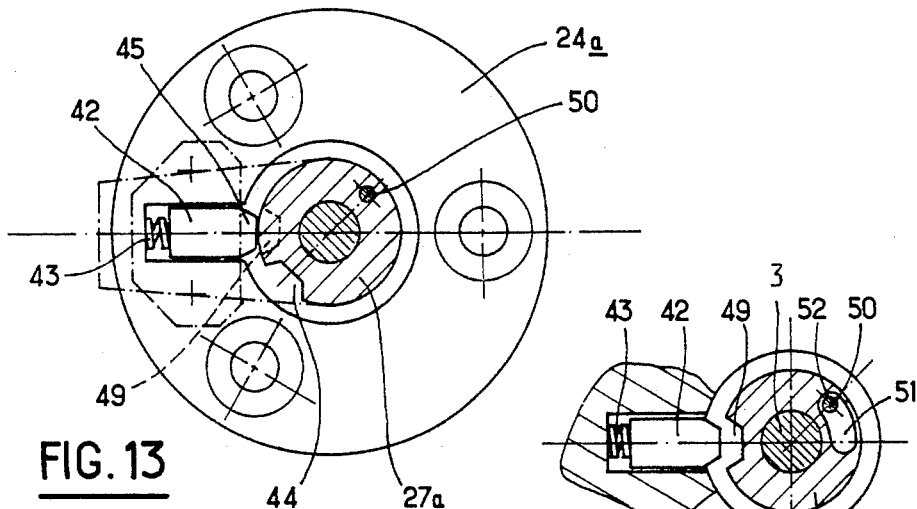
FIG. 13 is a cross section along line XIII—XIII of FIG. 11.
Figure 14:
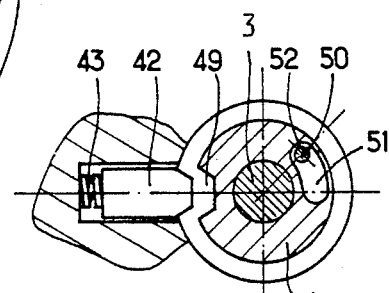
FIG. 14 is a cross section along line XIV—XIV of FIG. 11.

For instance, in the case of the mode of embodiment of FIG. 11 et seq., the means for ensuring the alignment of the slots 44 and 49 could comprise means for causing the shaft 3 to stop rotating in the normal direction of rotation when the slot 49 comes to be opposite the end 45 of the finger 42, the ring 46 being mounted free for rotation around the shaft 3. At the start of the motion of the shaft 3 in the reverse direction, the ring 46 will no longer be driven by the pin 50 which will be displaced in the hole 51. The slot 44 will therefore come to be aligned with the slot 49 and the finger 42 will enter into these two slots; when the alignment has been obtained, the finger 50 comes to bear against the other end of the hole 51 and the shaft 3 continues its motion in the opposite direction whilst the bush 27a is stopped from rotating in relation to the support 4.

When, as in the mode of embodiment of the FIGS. 2 to 10, the means for locking the crank 6 for rotation in relation to the support 4 comprise, at least to ensure the locking of the crank 6, at the start of the normal rotational motion, a pin-type device 30 capable of cooperating with a recess 41 or similar orientated radially, one of the elements (recess 41 or the pin 30) being fixed for rotation in relation to the support 4, whilst the other element (pin 30 or the recess 41) is fixedly connected to the crank 6, these two elements being disengaged from each other during the normal operation of the mechanism, the following variants may be envisaged;

The means for ensuring the locking of the crank 6 in relation to the support 4 when the shaft 3 is rotating in the opposite direction to the normal direction, may be formed by a finger orientated radially and pushed elastically towards the inside, this finger being mounted in a recess provided in a part integral with the crank and being situated on the side of the support; the end of this finger pushed radially towards the inside bears against a cylindrical ramp provided on a sleeve integral with the support, this ramp comprising a slot which can be crossed by the finger without a locking effect in the normal direction of rotation of the shaft 3, and wherein the finger is locked when the shaft 3 rotates in the opposite direction to the normal direction;

in accordance with another possibility, recess 41 (FIG. 2) intended to accommodate the end of the pin 30 is provided below the crank 6 on the side of the support 4 and forms a kind of radial groove whilst the pin is linked for rotation to the support, it being possible to displace this pin parallel to the axis of the shaft 3, in particular by the action of an electromagnet; in that case, the pin is caused to emerge when the shaft rotates in the opposite direction to the normal direction and at the start of obtaining the rotation of the shaft 3 in the normal direction so that the cooperation of the pin and of the groove locks the crank in relation to the support; on the other hand, for the continuation of the motion of the shaft 3 in the normal direction of rotation, the pin is withdrawn in the axial direction in relation to the crank 6 which is thus free to rotate in relation to the support 4.

We claim:

1. A transmission mechanism, for windscreen wipers in particular, between a rotary drive shaft (3), fixed in relation to a support (4) and a crank arm (5), for actuating an alternating oscillating motion, it being possible to reverse the direction of rotation of the rotary shaft (3), this transmission mechanism comprising:
    a crank (6) of a variable effective length (L), this length (L) having a first value in normal operation for a given direction of rotation of the shaft, whilst an increase in the effective length of the crank is actuated when the operation is stopped by reversal of the direction of rotation of the shaft (3);
    an eccentric (9), secured for rotation with the drive shaft (3), the said eccentric (9) being mounted in a bore (13) provided in the crank (6);
    means (V) for locking the rotation between the eccentric (9) and the crank (6), provided at the periphery of the eccentric for ensuring a linkage in rotation between the eccentric and the crank in the normal direction of rotation of the shaft and for releasing the eccentric in rotation in relation to the crank in the opposite direction of rotation of the shaft;
    and means (D) for locking the crank (6) for rotation in relation to the support (4) when the shaft (3) turns in the reverse direction to the normal direction, as well as at the start of the rotation of the shaft in the normal direction, whilst the crank (6) is free to turn in relation to the support (4) during the subsequent operation in the normal direction, the means (D) for locking the crank (6) for rotation in relation to the support (4) comprising:
    a sleeve (24, 24a) or similar, fixed to the support (4) and centred on the shaft (3), this sleeve comprising a central recess (H);
    at least one bush (27, 27a) freely traversed in rotation by the shaft (3) and mounted in the central recess (H) of the sleeve (24, 24a), this bush (27, 27a) being linked in rotation to the crank (6),
    and means (37; 42, 44, 49) for locking the bush (27, 27a) for rotation in relation to the sleeve (24, 24a) when the shaft turns in the reverse direction to the normal direction of operation, the bush (27, 27a) being free to rotate in relation to the sleeve (24, 24a) in the normal direction 2. A mechanism in accordance with claim 1, wherein the sleeve (24, 24a) has a radial extension (28) at its end next to the crank (6), this extension (28) being situated along the axial direction between the crank (6) and the sleeve (24, 24a), the linkage in rotation of the crank (6) and of the bush (27, 27a) being ensured by a pin (30, 30a), or similar, fixedly connected to the crank (6) and orientated substantailly orthogonally to the median plane of this crank (6), this pin (30, 30a) projecting towards the sleeve and passing through a radial hole (29) provided in the said extension (28), so that a translational motion should be permitted between the crank (6) and the bush (27, 27a).

3. A mechanism in accordance with claim 1 wherein the means (D) for locking the bush (27, 27a) for rotation in relation to the sleeve (24, 24a) during the reversal of the direction of rotation of the shaft (3), comprise a free-wheel device (37) or an equivalent one (a ratchet wheel), placed between the sleeve (24) and the bush (27), so that for the normal direction of rotation, the bush (27) should be free in relation to the sleeve (24), whilst for the reverse direction, the free-wheel (37) produces a locking effect and ensures the linkage in rotation of the sleeve (24) and of the bush (27).

4. A mechanism in accordance with claim 1 wherein the means (D) for locking the bush for rotation in relation to the sleeve comprise a finger (42) orientated substantially radially carried by the sleeve (24a) and being pushed elastically radially towards the inside against the cylindrical surface of the bush (27a) which comprises a slot (44) intended to accommodate the end (45) of the finger (42).

5. A mechanism in accordance with claim 4, wherein a ring (46), mounted around the shaft (3) is disposed axially against the bush (27a) and is linked to the latter with scope for angular displacement, the said ring (46) comprising a second slot (49) which can be aligned with, or be angularly displaced in relation to that of the bush, the above mentioned finger (42) having a thickness along the direction of the shaft which is sufficient for cooperating with the surfaces of the bush (27a) and of the ring (46), so that the finger (42) can only arrest the rotation of the bush (27a) in relation to the sleeve (24a) when the slots of the bush (27a) and of the ring (46) are aligned.

6. A mechanism in accordance with claim 5, characterised in that the linkage in rotation with scope for an angular displacement between the bush (27a) and the ring (46) is ensured by a pin (50), intended to cooperate with a circular arc shaped hole (51) or similar.

7. A transmission mechanism, for windscreen wipers in particular, between a rotary drive shaft (3), fixed in relation to a support (4) and a crank arm, for actuating an alternating oscillating motion, it being possible to reverse the direction of rotation of the rotary shaft (3), this transmission mechanism comprising:
    a crank (6) with a variable effective length (L), this length (L) having a first value in normal operation for a given direction of rotation of the shaft, while an increase in the effective length of the crank is obtained when the operation is stopped by a reversal of the direction of rotation of the shaft (3);
    an eccentric (9) secured for rotation with the drive shaft (3), the said eccentric (9) being mounted in a bore (13) provided in the crank (6);
    means (V) for locking the rotation between the eccentric (9) and the crank (6) provided at the periphery of the eccentric to ensure a linkage in rotation between the eccentric and the crank in the normal direction of rotation of the shaft and for releasing the eccentric from rotation in relation to the crank in the opposite direction of rotation of the shaft;

and means (D) for locking the crank (6) for rotation in relation to the support (4) when the shaft (3) rotates in the reverse direction to the normal direction, as well as at the start of the rotation of the shaft in the normal direction while the crank (6) is free to turn in relation to the support (4) during the subsequent operation in the normal direction, the means (D) for locking the crank (6) for rotation in relation to the support (4) comprising, at least in order to ensure that the crank is locked at the start of the normal rotational motion a pin type device (30) orientated substantially parallel to the axis of the shaft (3), capable of cooperating with a recess (41), orientated radially, one of the elements (pin or recess) being fixed in rotation in relation to the support (4), while the other element is integral with the crank (6), these two elements (30, 42) being disengaged from each other during the normal operation of the mechanism;

said transmission mechanism further comprising a sleeve (24) fixed to the support ((4) and centered on the shaft (3), this sleeve (24) comprising a central recess (H);

a bush (27) freely traversed in rotation by the shaft (3) and mounted in central recess (H) of the sleeve, this bush (27) being linked in rotation to the crank (6) by the pin (30) which is fixedly connected to the crank and orientated substantially orthogonally to the median plane of this crank, this pin (30) projecting towards the sleeve (24) and passing through a radial hole (29) provided in a radial extension (28) of the bush, so that a translational motion between the crank and the bush will be permitted, the length of the pin (30) being sufficient for its end (31) which is remote from the crank (6) to project beyond the extension (28) and means (37) for locking the bush in rotation in relation to the sleeve (24) when the shaft (3) turns in the reverse direction to the normal direction of operation, the bush (27) being free to turn in relation to the sleeve (24) in the normal direction.

8. A mechanism in accordance with claim 7 wherein the emergence of the pin (30) into the recess (41) is obtained at the start of the normal rotational motion, whilst the entry of the pin (30) into the recess (41) is obtained during the reversal of the direction of rotation.

* * * * *